United States Patent [19]

Gorter

[11] 4,040,113
[45] Aug. 2, 1977

[54] MAGNETORESISTIVE MAGNETIC HEAD

[75] Inventor: Frederik Willem Gorter, Eindhoven, Netherlands

[73] Assignee: U.S. Philips Corporation, New York, N.Y.

[21] Appl. No.: 668,948

[22] Filed: Mar. 22, 1976

[30] Foreign Application Priority Data

Apr. 15, 1975 Netherlands .................. 7504438

[51] Int. Cl.$^2$ .............................................. G11B 5/30
[52] U.S. Cl. ................................................ 360/113
[58] Field of Search ........................... 360/113; 324/46

[56] References Cited
FOREIGN PATENT DOCUMENTS 2,512,525  10/1975  Germany ............................ 360/113

Primary Examiner—Robert S. Tupper
Attorney, Agent, or Firm—Frank R. Trifari; Robert S. Smith

[57] ABSTRACT

A magnetic head having a magnetoresistive element. The element comprises a center tap, while on the left-hand half a pattern of equipotential strips is provided at an angle with the longitudinal direction of approximately 45° and on the right-hand half a pattern of equipotential strips is provided at an angle of approximately 135° with the longitudinal direction. The halves are each controlled with a current source and their output signals are subtracted from each other. The relation between the resistance of the total element and the value of external magnetic fields is more linear than in known magnetic heads having a magnetoresistive element and thermal noise is eliminated.

4 Claims, 4 Drawing Figures

MAGNETORESISTIVE MAGNETIC HEAD

The invention relates to a magnetic head for detecting information-representing magnetic fields on a magnetic recording medium and comprises an elongate magnetoresistive element having an easy axis of magnetisation having a direction which is parallel to the longitudinal axis of the element. The element has at its ends contacts for connection to an electric circuit for detecting resistance variations.

Such a magnetic head is known, for example, from the U.S. Pat. No. 3,493,694.

The operation of said so-called magnetoresistive head is based on the use of a strip-shaped element of a ferromagnetic, metallic material, for example, Ni-Fe. The element is provided on a non-magnetic substrate and is arranged in the immediate proximity of, or in contact with, a magnetic recording medium. The field of the recording medium produces variations in the magnetisation of the element and modulates the resistance thereof via the magnetoresistive effect. This means that when the recording medium passes the head, the information-representing magnetic fields present on the medium rotate the spin system of the magnetoresistive element so that the resistance varies. In this manner the output signal of an external circuit which is connected to the element assumes the shape of current, or voltage fluctuations representing the information stored in the recording medium.

Since the variation of the resistance of a magnetoresistive element is quadratic under the influence of a magnetic field, it is usual to optimize the operation in analogue recording by linearising the head.

For that purpose, according to the already mentioned U.S. Patent, a transverse magnetic bias field is applied, by external means, to an element. The easy axis of magnetisation of that element coincides with the longitudinal direction of the element. Under the influence of the field, the direction of magnetisation of the element which without a field coincides with the easy axis of magnetisation, is rotated through a certain angle. The strength of the bias field is preferably such that the direction of magnetisation encloses an angle of 45° with the longitudinal direction of the element which is also the direction of current passage through the element. The drawback of the use of the transversal magnetic bias field is that the possibility exists that the information on the recording medium is varried by it, while it is difficult to control the strength of the field at the correct value.

From published German Patent Application No. 2,121,443 it is also known, in contrast with the above-described technology, to linearise the magnetoresistive head by internal means. For this purpose, the easy axis of magnetisation is given a fixedly adjusted angle relative to the direction of current passage by means of a tempering process or by using the magnetostrictive properties. Since the characteristic of each magnetoresistive element is different, it is very difficult to obtain the same result in the described manner in all cases.

It is the object of the invention to provide a magnetic head of the present type in which the angle between the easy axis of magnetisation and the direction of current passage is adjusted in a quite new and reproducible manner and which in addition presents a number of extra advantages.

The invention is based on the recornigition that the current can be formed to travel at an angle with the longitudinal direction of a magnetoresistive element by providing on the magnetoresistive element a pattern of one or more parallel readily conducting equipotential strips which extend at an angle of minimum 30° and a maximum 60° with the longitudinal direction thereof between the contracts.

The advantages of the magnetic head according to the invention can include:

1. In order to achieve the desired angle between the direction of current and the direction of magnetisation, no transversal magnetic bias field is necessary. So no undesired influencing of the information on the recording medium can occur.

2. the angle between the direction of current and the easy axis of magnetisation can be fixed with external means. Moreover, the pattern of equipotential strips may be provided via the same mask with which the electric contacts are also provided on the element.

Although it appears that the resistance characteristic of a magnetoresistive element manufactured in such manner has a satisfactory linearity, it is nevertheless not optimum, since at the edges of the element the current does not travel exactly at the desired angle, which involves a certain deformation of the output signal. The magnitude of the deformation is depends on the height of the element. The smaller the height, the larger is the influence of the edges. Within the scope of the present invention, however, an optimum linearity of the resistance characteristic is achieved in that the element comprises in the center an electric contact, while on one said of the contact a pattern of one or more mutually parallel, readily conductive equipotential strips is provided at an angle between 30° and 60° with the easy magnetisation direction of the element, and on the other side of the contact a pattern is provided of one or more mutually parallel, readily conductive equipotential strips at an angle with the easy magnetisation direction of the element which is at least substantially the supplement of the angle and in which the signals between one end contact and the center contact and the other end contact and the center contact are applied to an electric circuit in which they are subtracted from each other.

The above-described magnetoresistive head is designed so that the resistance variation of one half under the influence of an external magnetic field is opposite to that of the other half. By subtracting the signals from each other it is ensured that an output signal is nevertheless obtained. The deformation as a result of the influence of the edges, however, compensate for each other so that the output signal is very well linear.

The invention will be described in greater detail, by way of example, with reference to the drawing.

Figure 1:
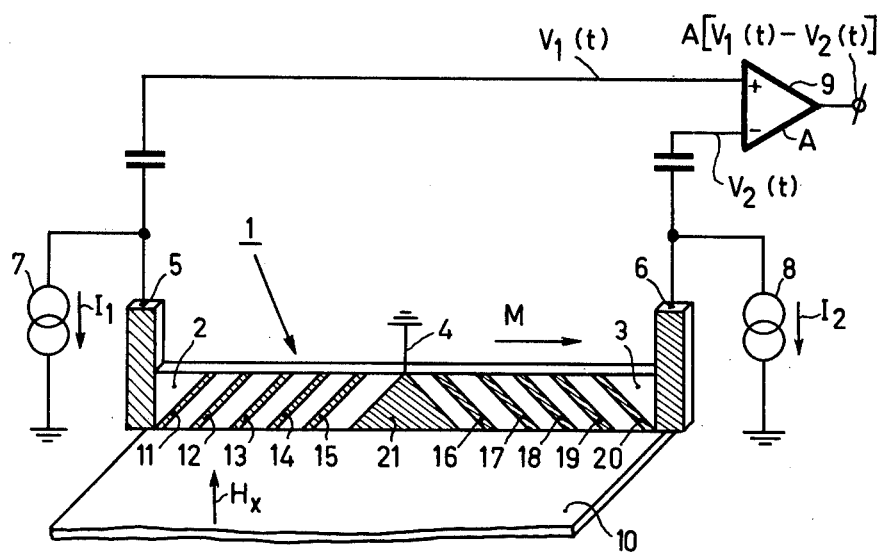
FIG. 1 is a simplified perspective view of a magnetic head with magnetoresistive element according to the invention.
Figure 2:
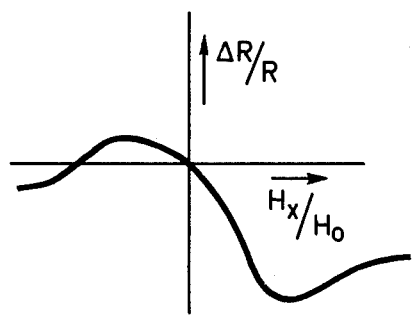
FIG. 2 is a graph showing the resistance variation $\Delta R/R$ of the left-hand half of the magnetoresistive element of the head of FIG. 1 as a function of an external magnetic field $H_x/H_o$.

FIG. 1 shows a magnetoresistive head which is used in reading-out the information content of a magnetic recording medium 10. The information content thereof is represented by the magnetic field $H_x$. The head comprises a magnetoresistive element 1 which has a conductive centre contact 21 and conductive end contacts 5, 6. In practice the element 1 is provided on a substrate but for reasons of clarity such a substrate, as well as a possible further housing, is not shown in the FIGURE. The center contact is grounded (4), and currents $I_1$ and $I_2$ are conveyed through the two havles 2, 3 of the element 1 by means of the current sources 7 and 8, respectively. The voltages between the contacts 21 and 5 and 21 and 6, respectively, are applied to a difference amplifier 9. In a prototype of the magnetic head according to the invention the element 1 consisted of an Ni-Fe alloy havinga thickness of approximately 1200 A, a length of approximately 200 microns and a height of approximately 10 microns. Thin gold strips 11, 12, 13, 14 and 15 having a thickness of 1 micron and a width of 5 microns were provided on the left-hand half 2 at an angle of approximately 45° with the easy magnetisation direction M, while similar strips 16, 17, 18, 19 and 20 were provided on the right-hand half 3 at an angle of 135° with the easy magnetisation direction M. Since gold has a five times lower resistivity than the Ni- Fe used and the thickness of the gold strips is approximately 10 times as large as the thickness of the Ni-Fe, the gold strips have a 50 times better conductivity and serve as "equipotential strips" which force the current in the Ni-Fe path between them to travel in the left-hand half 2 at an angle of 135° with the easy magnetisation direction and in the right-hand half 3 at an angle of 45° with the easy magnetisation direction. Under the influence of the field $H_x$ the direction of magnetisation of the element 1 is rotated through a given angle relative to the easy axis, so that the resistance of half 2, for example, becomes smaller whereas the resistance of half 3 increases. This situation is briefly explained in FIGS. 2 and 3. In FIG. 2 the resistance variation $\Delta R/R$ of half 2 is plotted on the vertical axis as a function of a reduced external field $H_x/H_o$. $H_x$ is the field of the recording medium 10. $H_o$ is the field at which saturation of the element occurs, assuming that the quadratic character of the resistance characteristic is maintained up to an angle of 90° between the direction of current passage and the direction of magnetisation. $H_o$ depends on the height and the thickness of the magnetoresistive element in question.

Figure 3:
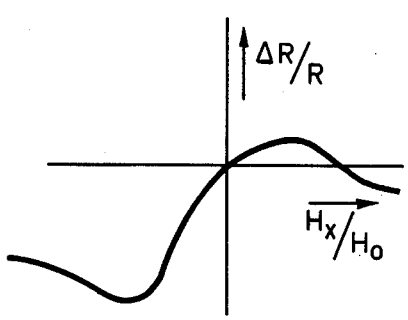
FIG. 3 is a graph showing the resistance variation $\Delta R/R$ of the right-hand half of the magnetoresistive element of the head of FIG. 1 as a function of an external magnetic field $H_x/H_o$.

As a result of the fact that the current near the edges of the element 1 does not travel exactly at the desired angle with the longitudinal direction, the curve which denotes the variation of $\Delta R/R$ as a function of $H_x/H_o$ shows a certain deformation. In addition, the operating point (the point of intersection of the curve with the vertical axis) is not favorable. In a similar manner the same holds for the right-hand half of the element 1. This situation is shown in FIG. 3.

Figure 4:
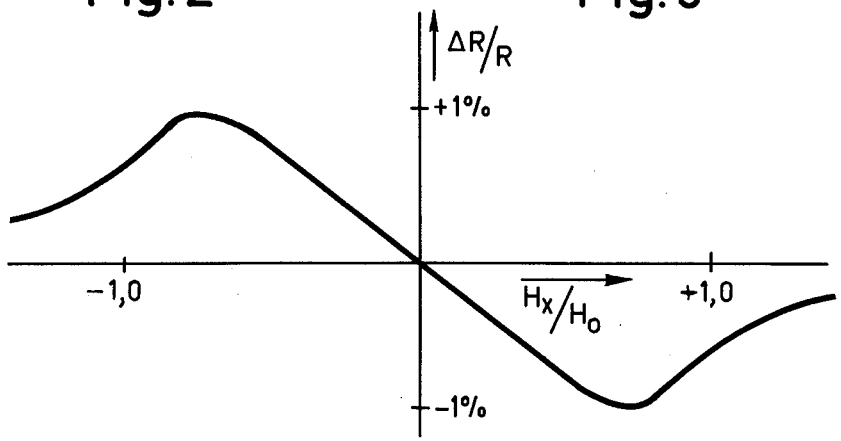
FIG. 4 is a graph showing the resistance variation $\Delta R/R$ of the total magnetoresistive element of the head of FIG. 1 as a function of an external magnetic field $H_x/H_o$.

When the voltage between the contacts 21 and 6 is subtracted from that between the contacts 21 and 5 in difference amplifier 9, the deformations of the two halves compensate for each other and the resistance characteristic of FIG. 4 is obtained which represents the behavior of the element 1 as a whole. The relation between the resistance variation $\Delta R/R$ and the reduced external field $H_x/H_o$ is significantly more linear that the behaviour of the halves individually shown in FIGS. 2 and 3. The operating point is also more favorable. An additional advantage which cannot be neglected is that the so-called temperature noise in the device described is considerably reduced. In practice it has been found that the resistance variation due to temperature fluctuations of a magnetoresistive element is of the same value as the resistance variations which are produced by varying magnetic fields on a recording medium scanned by the magnetoresistive head. Temperature fluctuations may occur by variations in the roughness of the recording medium with which the magnetoresistive head in in contact, as well as by variations in the thermal conductivity from the magnetoresistive head to the recording medium. When the resistance variation as a result of temperature fluctuations of the two havles of the element is the same, there is compensation for temperature noise.

What is claimed is:

1. A magnetic head for detecting information representing magnetic fields on a selected track of a magnetic recording medium, which head comprises an elongate magneto resistive sensing element, said element having:
    a. an edge adapted for cooperation, in parallel relationship, with a selected track of a recording medium;
    an axis of easy magnetisation parallel to said edge;
    c. A first end-contact, a middle-contact and a second end-contact, for connecting the element to an electrical circuit for detecting resistance variations, which middle-contact devides the element in two substantially equal parts, each having a length which substantially corresponds with half the width of a selected track;
    d. one equipotential strip, which is provided between the first end-contact and the middle-contact, at an acute-angle between 30° and 60° with the axis of easy-magnetisation;
    e. one equipotential strip, which is provided between the middle-contact and the second end-contact, at an obtuse-angle with the axis of easy magnetisation, which obtuse-angle is substantially the supplement of said acute-angle.

2. The combination of the magnetic head claimed in claim 1 with electrical circuitry which comprises:
    a current source for conveying a current through the magneto resistive sensing element between the middle-contact and the first end-contact, said current producing a first voltage across said contacts;
    b. a current source for conveying a current through the magneto resistive sensing element between the middle-contact and the second end-contact, said current producing a second voltage across said contacts;
    c. a differential amplifier, connected to the first end-contact and to the second end-contact, for subtracting the first voltage from the second voltage.

3. A magnetic head for detecting information representing magnetic fields in a selected track of a magnetic recording medium, which head comprises an elongate magneto resistive sensing element, said element having:
    a. an edge adapted for cooperation, in parallel relationship, with a selected track of a recording medium;
    b. an axis of easy magnetisation parallel to said edge
    c. a first end-contact, a middle-contact and a second end-contact, for connecting the element to an electrical circuit for detecting resistance variations, which middle-contact devides the element in two substantially equal parts, each having a length which substantially corresponds with half the width of a selected track;

d. a pattern of a plurality of parallel conductive equipotential strips, which is provided between the first-end contact and the middle-contact, at an actue angle between 30° and 60° with the axis of easy-magnetisation;

e. a pattern of a plurality of parallel conductive equipotential strips, which is provided between the middle-contact and the second end-contact, at an obtuse-angle with the axis of easy-magnetisation, which obtuse-angle is substantially the supplement of said acute-angle.

4. The combination of the magnetic head claimed in claim 3 with electrical circuitry which comprises:

a. a current source for conveying a current source for conveying a current through the magneto resistive sensing element between the middle-contact and the first end-contact, said current producing a first voltage across said contacts;

b. a current souce for conveying a current through the magneto resistive sensing element between the middle-contact and the second end-contact, said current producing a second voltage across said contacts;

c. a differential amplifier, connected to the first end-contact and to the second end-contact, for substracting the first voltage from the second voltage.

* * * * *

UNITED STATES PATENT OFFICE
CERTIFICATE OF CORRECTION

Patent No. 4040113      Dated August 2, 1977

Inventor(s) Frederik Willem Gorter

It is certified that error appears in the above-identified patent and that said Letters Patent are hereby corrected as shown below:

Column 1, line 50, "varried" should be --varied--.

Column 2, line 8, "contracts" should be --contract--.

Column 3, line 67, "that" should be --than--.

Column 4, line 11, after "head" delete "in" and insert --is--.

Claim 3, line 18, "actue" should be --acute--.

Claim 4, line 15, "substracting" should be --subtracting--.

Signed and Sealed this

Twenty-seventh Day of June 1978

[SEAL]

Attest:

RUTH C. MASON
*Attesting Officer*

DONALD W. BANNER
*Commissioner of Patents and Trademarks*